(12) United States Patent
Low et al.

(10) Patent No.: US 9,843,436 B2
(45) Date of Patent: Dec. 12, 2017

(54) FLEXIBLE INTERCONNECT ARCHITECTURE

(71) Applicant: Intel Corporation, Santa Clara, CA (US)

(72) Inventors: Chia How Low, Simpang Ampat (MY); Su Sin Florence Phun, Penang (MY)

(73) Assignee: Intel Corporation, Santa Clara, CA (US)

( * ) Notice: Subject to any disclaimer, the term of this patent is extended or adjusted under 35 U.S.C. 154(b) by 121 days.

(21) Appl. No.: 14/752,856

(22) Filed: Jun. 27, 2015

(65) Prior Publication Data
US 2016/0380747 A1     Dec. 29, 2016

(51) Int. Cl.
*H04L 5/16* (2006.01)
*G06F 13/40* (2006.01)

(52) U.S. Cl.
CPC ............ *H04L 5/16* (2013.01); *G06F 13/4072* (2013.01)

(58) Field of Classification Search
CPC ... H04L 5/14; H04L 5/1423; H04L 5/16; H04N 1/00822; H04N 1/2369; H04N 2201/33335; H04N 2201/33364; H04W 76/005; H04W 84/08
USPC ......................................................... 370/276
See application file for complete search history.

(56) References Cited

U.S. PATENT DOCUMENTS

| | | | | |
|---|---|---|---|---|
| 5,666,559 A * | 9/1997 | Wisor | ................. | G06F 11/0745 710/29 |
| 6,594,529 B1 * | 7/2003 | Boggs | ................ | G05B 19/0423 365/189.05 |
| 2001/0037491 A1 * | 11/2001 | Boggs | ..................... | G06F 1/025 717/128 |
| 2002/0071398 A1 * | 6/2002 | Moran | ..................... | H04L 47/10 370/252 |
| 2003/0120852 A1 * | 6/2003 | McConnell | ........... | G06F 13/385 710/316 |
| 2005/0193302 A1 * | 9/2005 | Arguelles | ......... | G01R 31/31716 714/733 |
| 2006/0212662 A1 * | 9/2006 | Ueda | ..................... | G06F 13/385 711/147 |
| 2008/0152024 A1 | 6/2008 | Takeuchi | | |
| 2008/0320202 A1 | 12/2008 | Monks et al. | | |
| 2011/0231685 A1 * | 9/2011 | Huang | .................. | G06F 1/3203 713/321 |
| 2011/0271019 A1 * | 11/2011 | Ishii | ..................... | G06F 13/385 710/63 |

(Continued)

FOREIGN PATENT DOCUMENTS

WO     2012056043 A1     5/2012

OTHER PUBLICATIONS

International Search Report and Written Opinion in International Patent Application PCT/US2016/034526 dated Sep. 26, 2016 (13 pages).

*Primary Examiner* — Robert Lopata
(74) *Attorney, Agent, or Firm* — Patent Capital Group

(57) ABSTRACT

A port is provided to facilitate a link between a first device and a second device. The port can include a driver circuit to support half duplex communication between the first device and the second device and further include switching logic to receive a value and cause the driver circuit to function in one of a plurality of half duplex modes based on the value. The value is based on a configuration register value corresponding to the port.

20 Claims, 17 Drawing Sheets

(56) References Cited

U.S. PATENT DOCUMENTS

| | | | |
|---|---|---|---|
| 2012/0117294 A1* | 5/2012 | Jadus | G06F 13/4004 710/315 |
| 2012/0309456 A1* | 12/2012 | Yamamoto | H04L 25/0278 455/557 |
| 2013/0163604 A1 | 6/2013 | Kondapalli et al. | |
| 2014/0006652 A1* | 1/2014 | Chen | G06F 11/3051 710/16 |
| 2014/0006654 A1* | 1/2014 | Chan | G06F 13/385 710/16 |
| 2014/0006655 A1* | 1/2014 | Chan | G06F 11/3051 710/16 |
| 2014/0006664 A1* | 1/2014 | Chen | G06F 13/4072 710/106 |
| 2014/0059267 A1* | 2/2014 | Lai | G06F 13/4059 710/313 |
| 2014/0189391 A1* | 7/2014 | Jeyaseelan | G06F 1/3206 713/320 |
| 2014/0365690 A1* | 12/2014 | Paramasivam | G06F 13/102 710/8 |
| 2015/0227489 A1* | 8/2015 | Chen | G06F 13/385 710/313 |
| 2015/0370751 A1* | 12/2015 | Perrine | G06F 13/4068 710/106 |
| 2016/0140011 A1* | 5/2016 | Yeung | G06F 11/325 710/10 |
| 2016/0162427 A1* | 6/2016 | Kang | G06F 13/4282 710/313 |
| 2016/0170472 A1* | 6/2016 | Cosaro | G06F 1/3287 710/104 |

\* cited by examiner

FLEXIBLE INTERCONNECT ARCHITECTURE

FIELD

The present disclosure relates in general to the field of computer communications, and more specifically, to computing interconnect architectures.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures. Universal Serial Bus (USB) and the related Embedded USB technologies are used in some of these existing interconnect architectures.

BRIEF DESCRIPTION OF THE DRAWINGS

Like reference numbers and designations in the various drawings indicate like elements.

DETAILED DESCRIPTION

Figure 1:
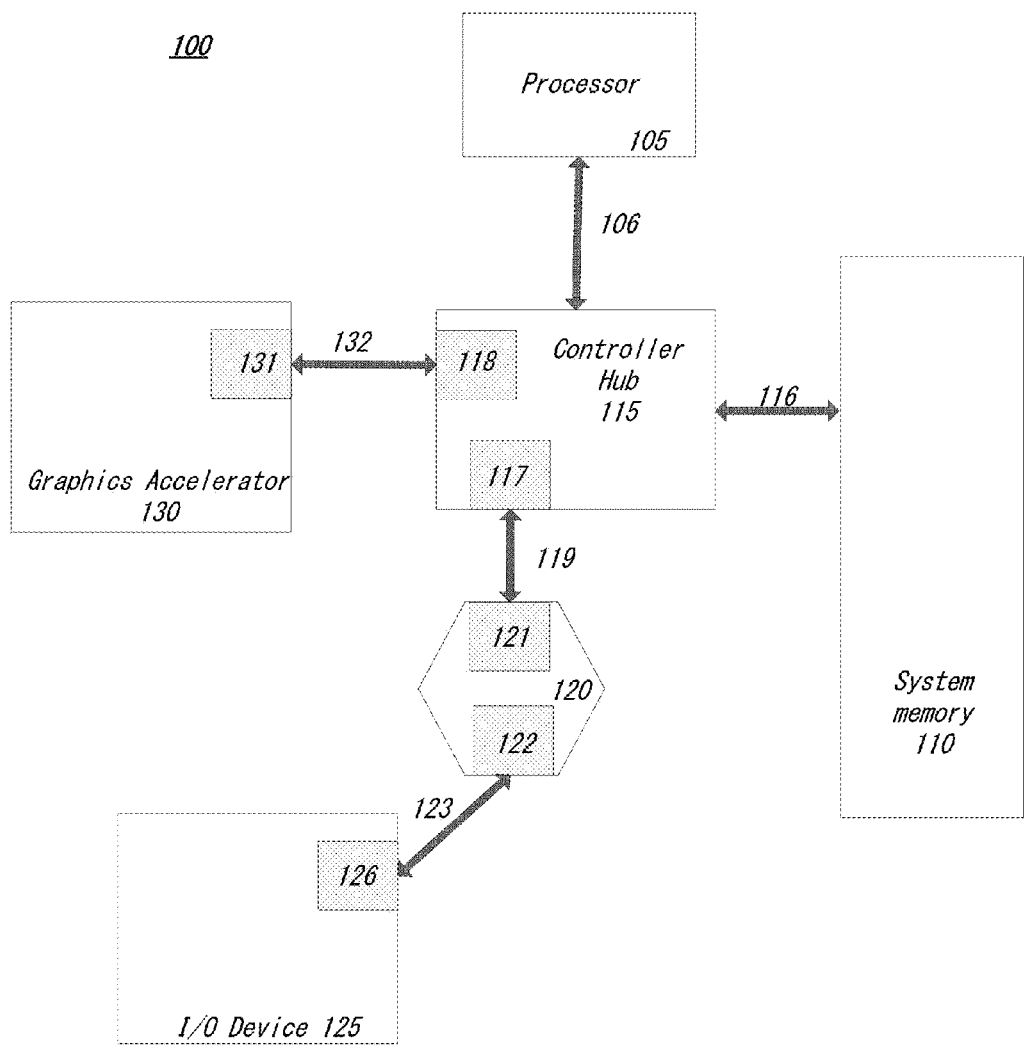
FIG. 1 illustrates a simplified block diagram of a system including a serial point-to-point interconnect to connect I/O devices in a computer system in accordance with one embodiment.

In the following description, numerous specific details are set forth, such as examples of specific types of processors and system configurations, specific hardware structures, specific architectural and micro architectural details, specific register configurations, specific instruction types, specific system components, specific processor pipeline stages, specific interconnect layers, specific packet/transaction configurations, specific transaction names, specific protocol exchanges, specific link widths, specific implementations, and operation etc. in order to provide a thorough understanding of the present invention. It may be apparent, however, to one skilled in the art that these specific details need not necessarily be employed to practice the subject matter of the present disclosure. In other instances, well detailed description of known components or methods has been avoided, such as specific and alternative processor architectures, specific logic circuits/code for described algorithms, specific firmware code, low-level interconnect operation, specific logic configurations, specific manufacturing techniques and materials, specific compiler implementations, specific expression of algorithms in code, specific power down and gating techniques/logic and other specific operational details of computer system in order to avoid unnecessarily obscuring the present disclosure.

Although the following embodiments may be described with reference to energy conservation, energy efficiency, processing efficiency, and so on in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from such features. For example, the disclosed embodiments are not limited to server computer system, desktop computer systems, laptops, Ultrabooks™, but may be also used in other devices, such as handheld devices, smartphones, tablets, other thin notebooks, systems on a chip (SOC) devices, and embedded applications. Some examples of handheld devices include cellular phones, Internet protocol devices, digital cameras, personal digital assistants (PDAs), and handheld PCs. Here, similar techniques for a high-performance interconnect may be applied to increase performance (or even save power) in a low power interconnect. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As may become readily apparent in the description below, the embodiments of methods, apparatus', and systems described herein (whether in reference to hardware, firmware, software, or a combination thereof) may be considered vital to a "green technology" future balanced with performance considerations.

As computing systems are advancing, the components therein are becoming more complex. The interconnect architecture to couple and communicate between the components has also increased in complexity to ensure bandwidth demand is met for optimal component operation. Furthermore, different market segments demand different aspects of interconnect architectures to suit the respective market. For example, servers require higher performance, while the mobile ecosystem is sometimes able to sacrifice overall performance for power savings, form factor, and usability. A variety of different interconnects can potentially benefit from subject matter described herein.

The Universal Serial Bus (USB) architecture, embedded USB (eUSB) architecture, Peripheral Component Interconnect (PCI) Express (PCIe) interconnect architecture, and QuickPath Interconnect (QPI) fabric architecture, among other examples, can potentially be improved according to one or more principles described herein, among other examples. For instance, a primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express. As another example, USB addresses interconnects connecting hosts with devices, for instance, to extend the functionality of the host through various peripheral devices, such as telephone/fax/modem adapters, answering machines, scanners, PDA's, keyboards, mice, etc. For example, USB can provide a user-friendly plug-and-play way to attach external peripherals to a Personal Computer (PC). USB can be used to facilitate connection between other devices, such as connecting a printer to interface to interface directly with a camera, to connect a mobile device to keyboards, mice, and external displays. Indeed, USB ports are being increasingly embedded in more other appliances, including automobiles, televisions, and set-top boxes. Further, USB's power delivery features have allowed USB ports to also function as a mobile device charging solution, among other solutions. The benefits of USB can be extended to inter-chip connections (e.g., between devices on a single board or system on chip (SoC)) as well as static, or permanent, peripheral device connections (e.g., to connect to a digital camera module permanently attached to the device (e.g., a laptop, tablet, or smart phone)), among other examples. Although the primary discussion herein may at times reference a particular architecture or protocol, it should be appreciated that aspects of the concepts described herein may be applied to other interconnect architectures, such as a PCIe-compliant architecture, a USB-compliant architecture, a QPI-compliant architecture, a MIPI compliant architecture, or other known interconnect architecture.

Referring to FIG. 1, an embodiment of a fabric composed of point-to-point links that interconnect a set of components is illustrated. System 100 includes processor 105 and system memory 110 coupled to controller hub 115. Processor 105 can include any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 can include a root hub, root complex, or root controller, such as in an interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, e.g., a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, can include/implement a layered protocol stack to provide communication between controller hub 115 and switch 120. In one embodiment, multiple devices are capable of being coupled to switch 120.

Switch/bridge 120 can route packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Devices can include functionality for initiating and communicating with other devices using a close proximity wireless connection. Devices, in some contexts, can be referred to as an endpoint. Although not specifically shown, a device 125 may include a bridge (e.g., a PCIe to PCI/PCI-X bridge) to support legacy or other versions of devices or interconnect fabrics supported by such devices.

Graphics accelerator 130 can also be coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
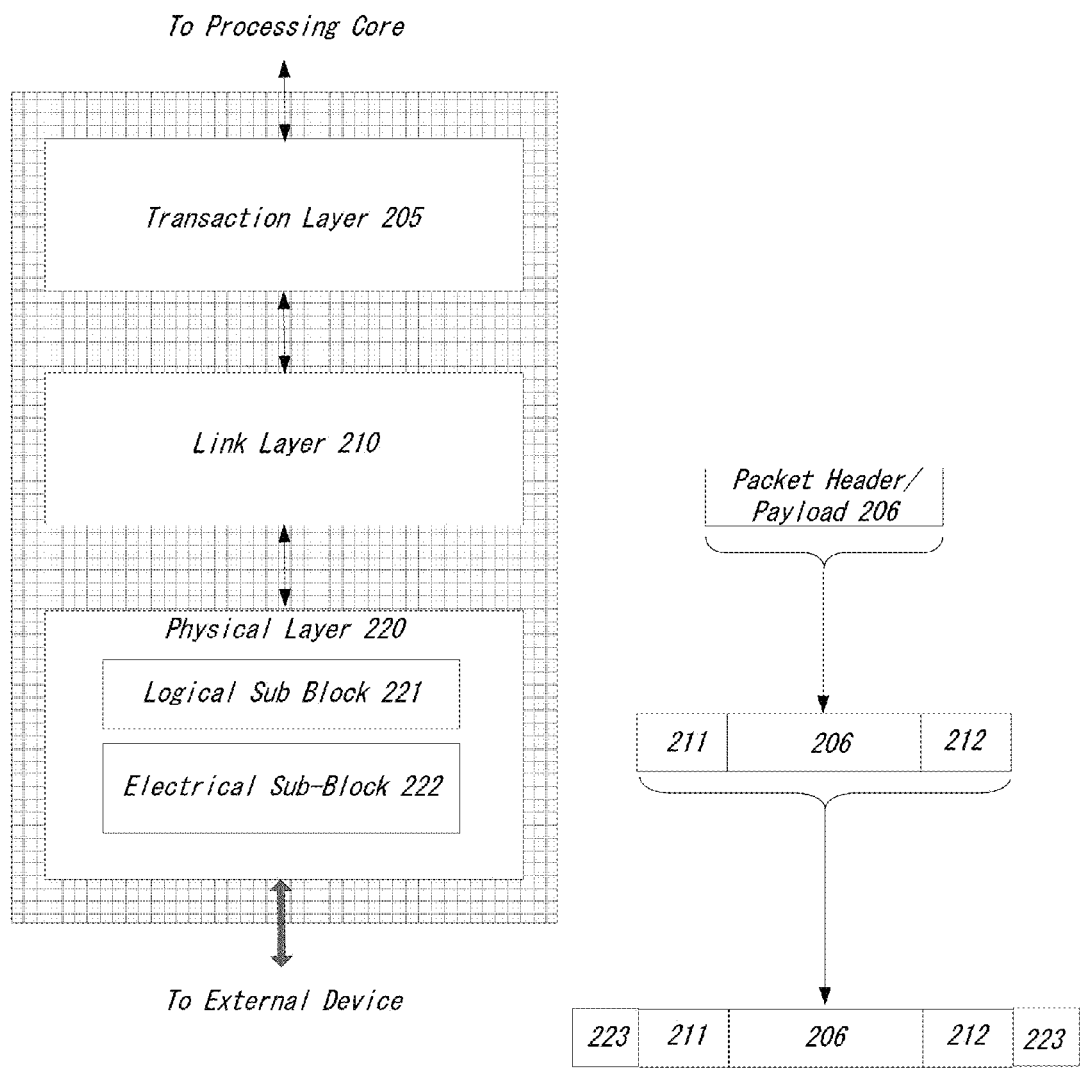
FIG. 2 illustrates a simplified block diagram of a layered protocol stack in accordance with one embodiment.

Turning to FIG. 2 an embodiment of a layered protocol stack is illustrated. Layered protocol stack 200 can includes any form of a layered communication stack, such as a QPI stack, a PCIe stack, USB stack, a next generation high performance computing interconnect (HPI) stack, or other layered stack. In one embodiment, protocol stack 200 can include transaction layer 205, link layer 210, and physical layer 220. One or more interfaces, such as interfaces 117, 118, 121, 122, 126, and 131 in FIG. 1, may be represented as communication protocol stack 200. Representation as a communication protocol stack may also be referred to as a module or interface implementing/including a protocol stack.

Packets can be used to communicate information between components. Packets can be formed in the Transaction Layer 205 and/or Data Link Layer 210 to carry the information from the transmitting component to the receiving component. As the transmitted packets flow through the other layers, they are extended with additional information used to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

In one embodiment, transaction layer 205 can provide an interface between a device's processing core and the interconnect architecture, such as Data Link Layer 210 and Physical Layer 220. In this regard, a primary responsibility of the transaction layer 205 can include the assembly and disassembly of packets (i.e., transaction layer packets, or TLPs). The translation layer 205 can also manage credit-based flow control for TLPs. In some implementations, split transactions can be utilized, i.e., transactions with request and response separated by time, allowing a link to carry other traffic while the target device gathers data for the response, among other examples.

Credit-based flow control can be used in some protocols to realize virtual channels and networks utilizing the interconnect fabric. In one example, a device can advertise an initial amount of credits for each of the receive buffers in Transaction Layer 205. An external device at the opposite end of the link, such as controller hub 115 in FIG. 1, can count the number of credits consumed by each TLP. A transaction may be transmitted if the transaction does not exceed a credit limit. Upon receiving a response an amount of credit is restored. One example of an advantage of such a credit scheme is that the latency of credit return does not affect performance, provided that the credit limit is not encountered, among other potential advantages.

In one embodiment, four transaction address spaces can include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions can be used to access configuration space of various devices connected to the interconnect. Transactions to the configuration space can include read requests and write requests. Message space transactions (or, simply messages) can also be defined to support in-band communication between interconnect agents. Therefore, in one example embodiment, transaction layer 205 can assemble packet header/payload 206.

A Link layer 210, also referred to as data link layer 210, can act as an intermediate stage between transaction layer 205 (or a protocol layer) and the physical layer 220. In one embodiment, a responsibility of the data link layer 210 is providing a reliable mechanism for exchanging Transaction Layer Packets (TLPs) between two components on a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

In one example, physical layer 220 includes logical sub block 221 and electrical sub-block 222 to physically transmit a packet to an external device. Here, logical sub-block 221 is responsible for the "digital" functions of Physical Layer 221. In this regard, the logical sub-block can include a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one example embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a protocol stack (such as a PCIe protocol stack), a layered protocol stack is not so limited. In fact, any layered protocol may be included/implemented and adopt features discussed herein, as well as other additional or alternative features. As an example, a port/interface that is represented as a layered protocol can include: (1) a first layer to assemble packets, i.e. a transaction layer; a second layer to sequence packets, i.e. a link layer; and a third layer to transmit the packets, i.e. a physical layer. As a specific example, a high performance interconnect layered protocol, as described herein, is utilized.

Figure 3:
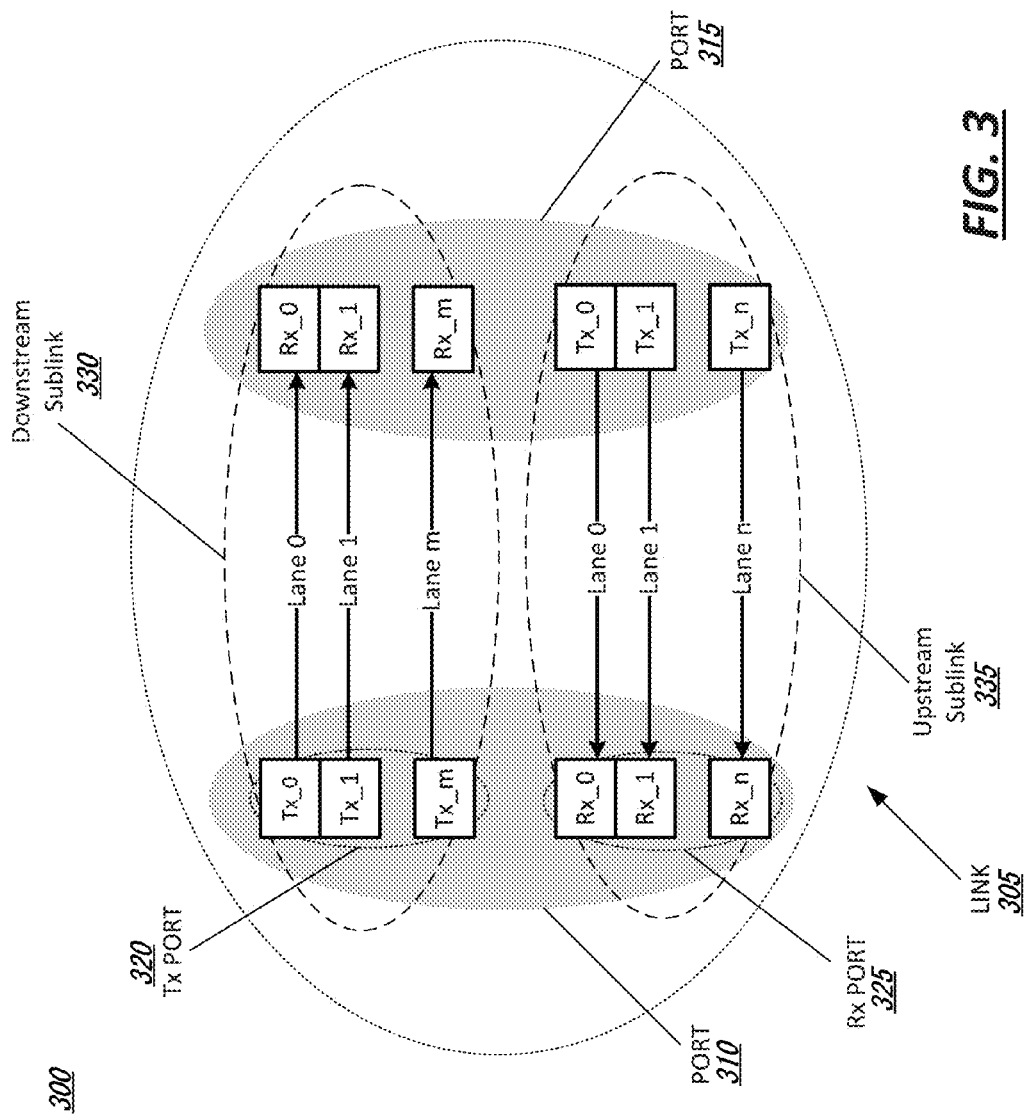
FIG. 3 illustrates an embodiment of a serial point-to-point link connecting two ports.

Referring next to FIG. 3, an example embodiment of a serial point to point fabric is illustrated. A serial point-to-point link 305 can include any transmission path for transmitting serial data. Accordingly, a device can include transmission logic to transmit data to another device and receiving logic to receive data from the other device. In other words, two transmitting paths (e.g., one upstream and one downstream) can be included in some implementations of a link 305.

A transmission path refers to any path for transmitting data, such as a transmission line, a copper line, an optical line, a wireless communication channel, an infrared communication link, or other communication path. A link may support one lane—each lane representing a set of differential signal pairs (one pair for transmission, one pair for reception). To scale bandwidth, a link may aggregate multiple lanes (e.g., denoted by m and n), where the number of lanes represents the potential supported link width of the link 305, such as 1, 2, 4, 8, 12, 16, 32, 64 lanes, or wider).

In the particular example of FIG. 3, a device can include and utilize a port to 310 to facilitate the link 305. The port 310 can communicate data over the link 305 with a port 315 of another endpoint device. In one embodiment, the port 310 can include a transmitter port 320 and a receiver port 325. Further, the transmitter port 320 can be utilized in a downstream sublink 330 to send data to the other device over corresponding lanes (e.g., lanes 0-m). Similarly, a receiver port 325 can receive data from the other device over an upstream sublink 335 (including lanes 0-n).

Some links can utilize a differential pair to realize two transmission paths to transmit differential signals. As an example, when a first line toggles from a low voltage level to a high voltage level, i.e. a rising edge, the other line can drives from a high logic level to a low logic level, i.e. a falling edge. Differential signals can potentially demonstrate better electrical characteristics, such as better signal integrity, i.e. cross-coupling, voltage overshoot/undershoot, ringing, among other example advantages. This allows for a better timing window, which enables faster transmission frequencies, among other potential advantages.

In the case of eUSB, USB technology (e.g., USB2.0), originally optimized for external device interconnect, is enhanced for use as an inter-chip interconnect. eUSB can improve both the link active and idle power efficiency while providing a low voltage USB2.0 PHY solution that does not adhere to the traditional 3.3V IO signaling requirement. In some implementations, eUSB and base USB (e.g., eUSB2 and USB2.0) are not electrically compatible, but eUSB defines a mechanism for eUSB to support standard USB devices.

Figure 4:
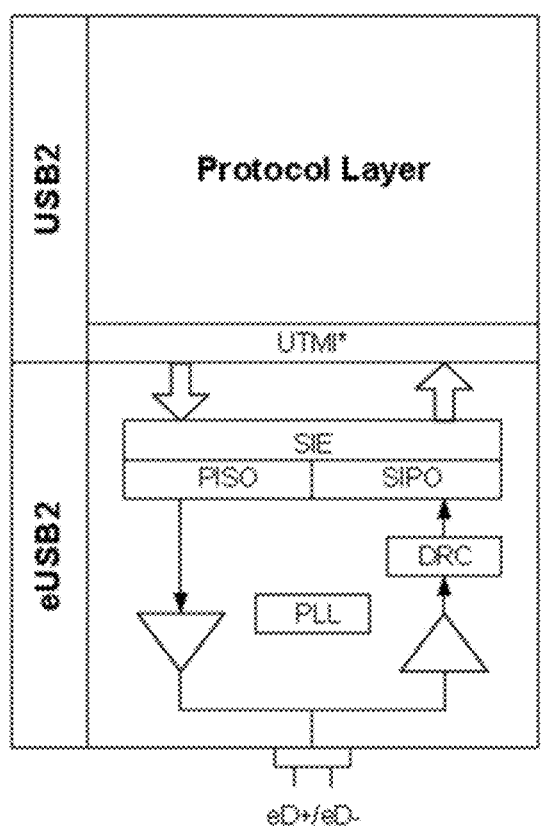
FIG. 4 is a block diagram illustrating aspects of embedded USB (eUSB).
Figure 5:
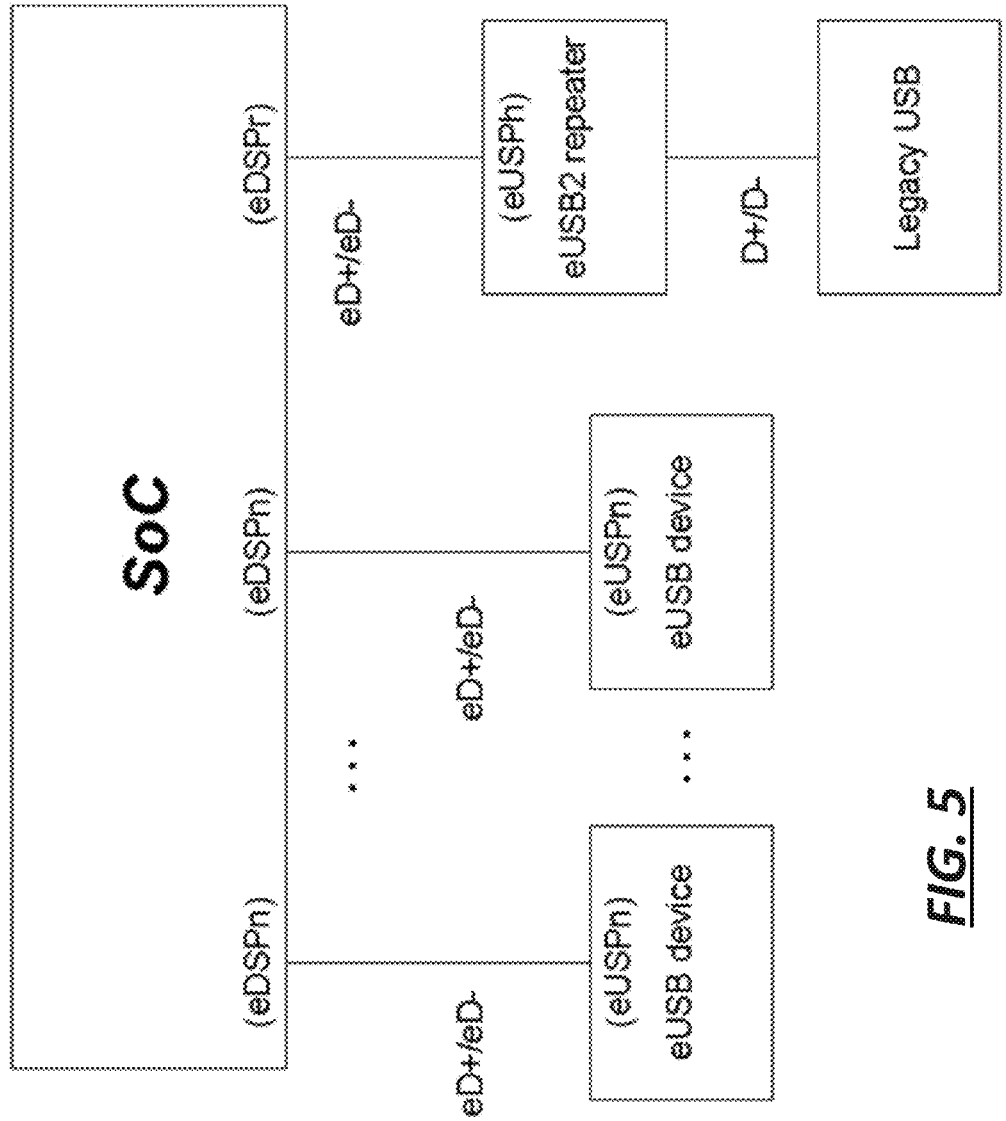
FIG. 5 is a block diagram illustrating use cases of supported operation modes in eUSB.

As illustrated in FIG. 4, in some implementations, eUSB2 is fully compliant to USB2.0 layer architecture and supports high-speed, full-speed, and low-speed operation. For instance, eUSB can be fully compliant to the USB protocol layer specification allowing no change to USB software programming model. In the case of high speed operation, eUSB supports high speed, low voltage differential signaling. However, eUSB may be incompatible with the base USB physical layer (PHY). Accordingly, below a standard USB (e.g., USB2.0, USB3.0, etc.) protocol layer 405, an eUSB physical layer 410 can be provided. An interface 415, such as an interface defined according to the USB Transceiver Macrocell Interface (UTMI) or UTMI Plus (UTMI+) specification, can be provided to serve as the interface between protocol layer 405 and eUSB physical layer 410. The eUSB physical layer 410 can include, for instance, a serial interface engine (SIE) 420, shift registers such as a serial-in, parallel-out (SIPO) shift register 425 and parallel-in, serial-out (PISO) shift register 430, a phase-locked loop (PLL) element 435, among other example components. Data pins eD+ (440) and eD− (445) can be provided through which high speed differential signals can be sent and received.

eUSB can supports two modes of operation: native mode and repeater mode. In native mode, both the host and device port implement an eUSB PHY and communicate based on eUSB signaling. Native mode eUSB2 can be used, for instance, for inter-chip interconnect. Single speed configuration is allowed in native mode. Repeater mode refers to an eUSB2 port communicating with a base USB port (e.g., USB2.0 port) through a repeater that translates between eUSB signaling and USB signaling. Repeater mode may also be used between two eUSB ports communicating with each other through two repeaters, such a case typically involves applications with USB2.0 receptacles at both sides of the ports. FIG. 5 is a simplified block diagram 500 illustrating example usages of eUSB in native and repeater mode. For instance, in native mode, eUSB connection can be used to interconnect to devices, such as devices on a system on chip (SoC). For instance, a first eUSB port can be used to connect SoC 505 to a first eUSB-enabled device 510 and a second eUSB port can be used to connect SoC 505 to a second eUSB-enabled device 515. Further, an eUSB repeater 520 can be used to realize legacy USB features by connecting the SoC 505 to a USB port of device 525. For instance, in some implementations, eUSB can be a useful alternative interface in systems where gate transistor thickness does not allow 3.3V legacy USB2.0, but where legacy USB features (e.g., USB Type C) is still desired. In this and similar instances, an eUSB port (on the SoC 505) and repeater 520 can be utilized for a legacy USB connection. The example shown in FIG. 5 shows the two modes, native and repeater, and how a collection of eUSB ports can include, in the same system, both some ports in native mode and some ports in repeater mode.

Figure 6:
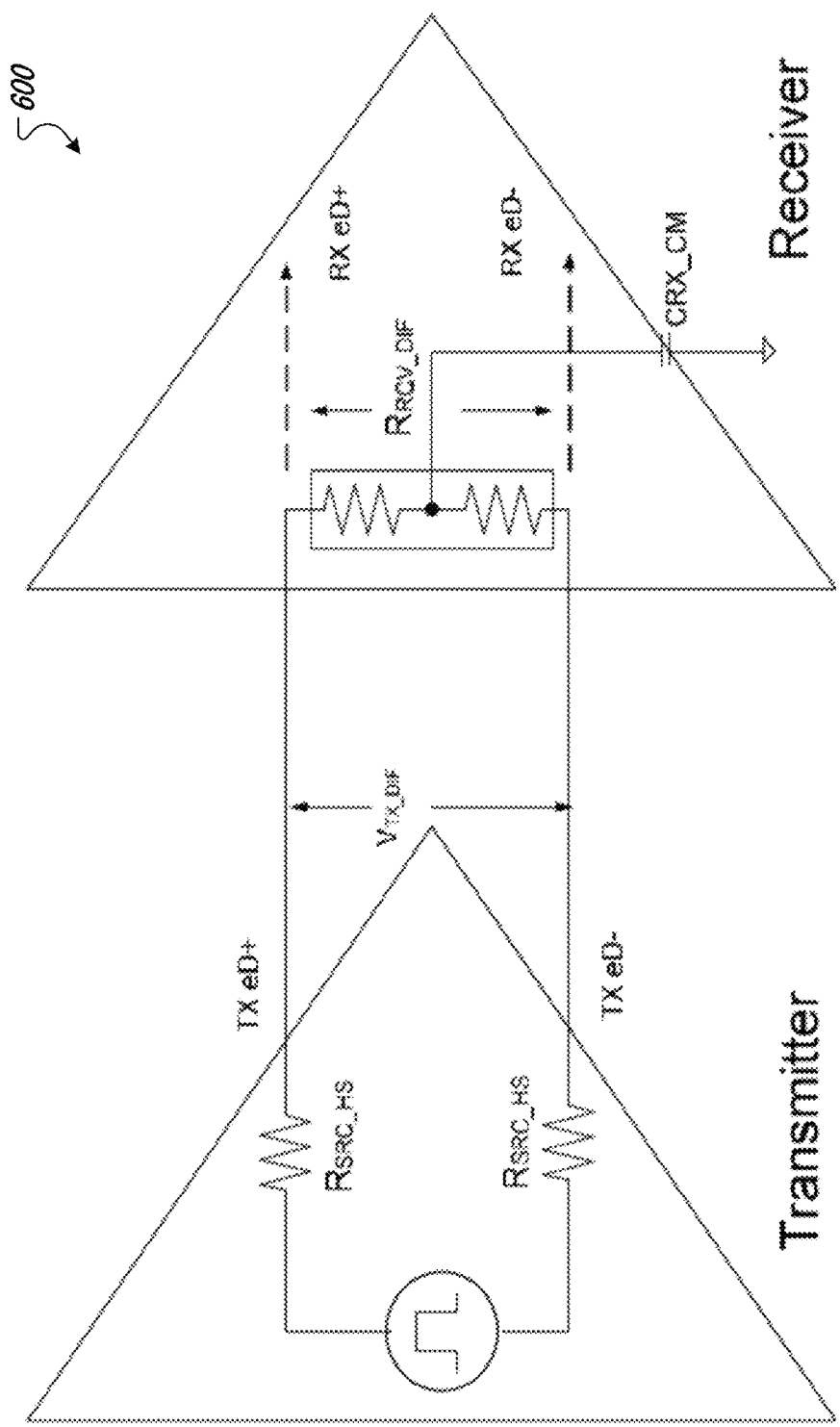
FIG. 6 illustrates a representation of a receiver and transmitter.

Among the differences between native and repeater modes in eUSB, in repeater mode, high speed receiver termination may be mandatory, while receiver termination is optional for native mode. eUSB2 communication is half-duplex where transmitter and receiver share the same IO pad (e.g., as in the example illustrated in FIG. 6. Further, the eUSB high speed transceiver implements a parallel termination scheme which involves termination at the receiver end. The block diagram 600 of FIG. 6 further shows an example of a eUSB2 transceiver circuit. In this representation 600, RSRC_HS is the transmitter source termination. VTX_DIF is the peak differential swing across the transmitter eD+ and eD− pads. RRCV_DIF represents the optional receiver differential termination. CRX_CM is an on-die capacitor, which can be included to suppress alternating current (AC) common mode fluctuation seen by the receiver. The high-speed transceiver can implements low swing differential signaling. In such cases, the transmitter is source terminated to deliver good signal integrity. The receiver could be differentially terminated or un-terminated. As noted above, receiver termination can depend on the use case and channel characteristics (e.g., required in repeater mode but optional in native mode). The eUSB2 receiver circuit can extract clock information from the incoming data stream and perform data recovery. The squelch circuit can be implemented as an amplitude envelope detection circuit to differentiate between valid signal and wire noise. It can also be used by the repeater to perform data traffic flow control.

Figure 7:
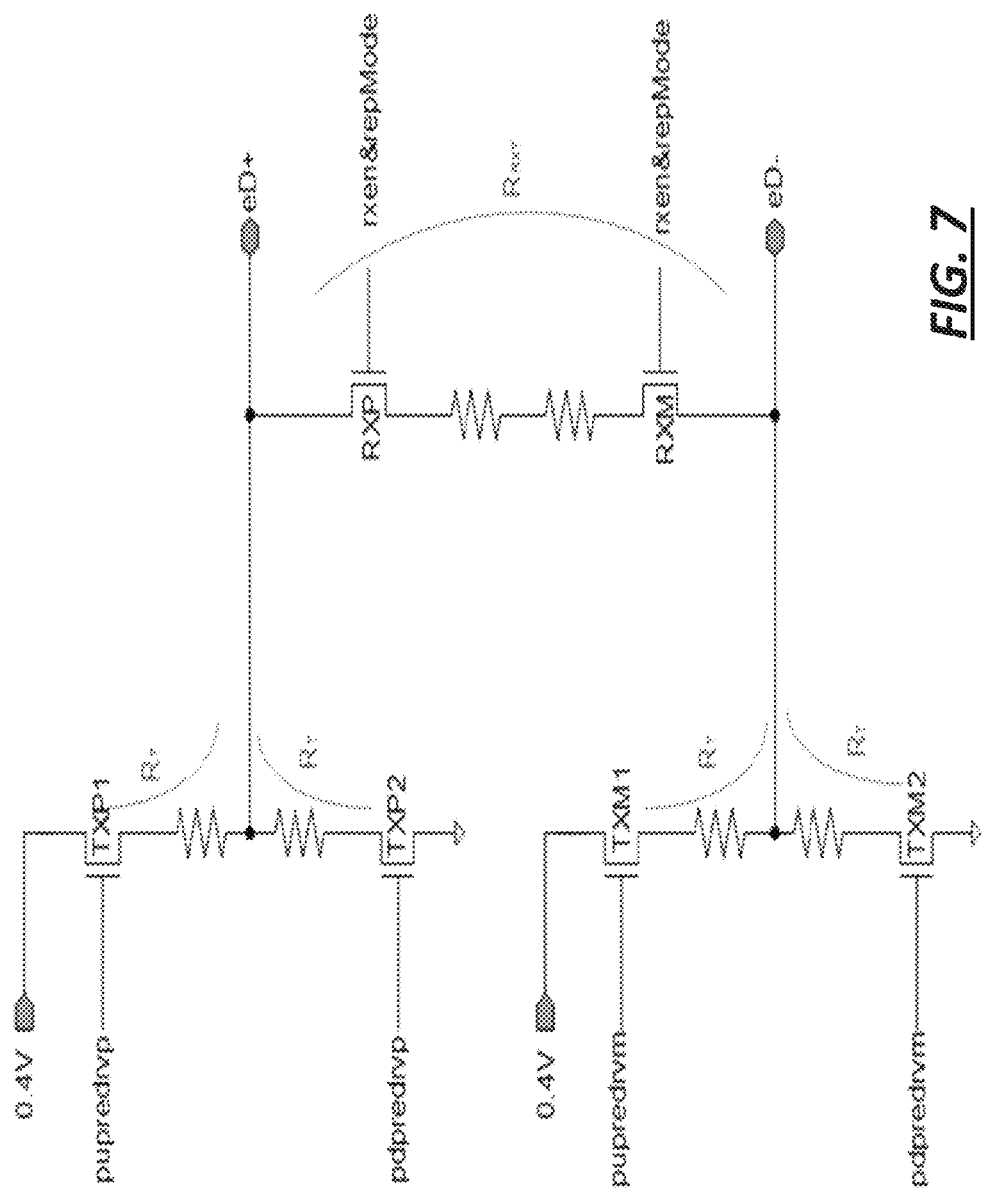
FIG. 7 illustrates a schematic diagram of a conventional driver circuit.

FIG. 7 is a block diagram illustrating a generic eUSB driver design to provide on-die termination in transmission and receive mode. Two separate drivers are provided for the on-die terminations during transmission and receive mode respectively. A generic driver design, while conventional, utilizes both dedicated driver and control signals to enable termination at the transmit and receive sides in different operation modes. To support multiple termination options in such a design, multiple, separate drivers and compensation schemes are dedicated for each, resulting in expensive buffer die size and design efforts. Indeed, the conventional approach would be for an intellectual property (IP) (or computing) block designed to use two separate eUSB drivers to provide termination options during TX and RX for supporting native and repeater mode.

In modern SoC design, platform design is very dynamic. As an alternative to the conventional eUSB driver design illustrated in FIG. 7, a more flexible design can be provided, as described below, that is capable of supporting multiple alternative platform topologies in different products from the same design. For instance, a control signal and switching logic (e.g., implemented at least in part by switching hardware, such as an N-type metal oxide semiconductor (NMOS) switch) can be provided in an eUSB driver design to enable termination and un-termination options for both native and repeater modes. Additionally, the control signal can be further used to enable resistance/impedance offsetting to further adjust the termination impedance value for signal integrity improvement during receiving in repeater mode. Accordingly, using such a design, a product team utilizing such eUSB ports in an SoC (or other system) design can the same eUSB PHY core to work in either native or repeater mode by specifying a configuration register value (e.g., a single mode selection bit) through system Basic Input/Output System (BIOS) without silicon stepping or other pre-silicon design changes, among other example advantages.

Figure 8:
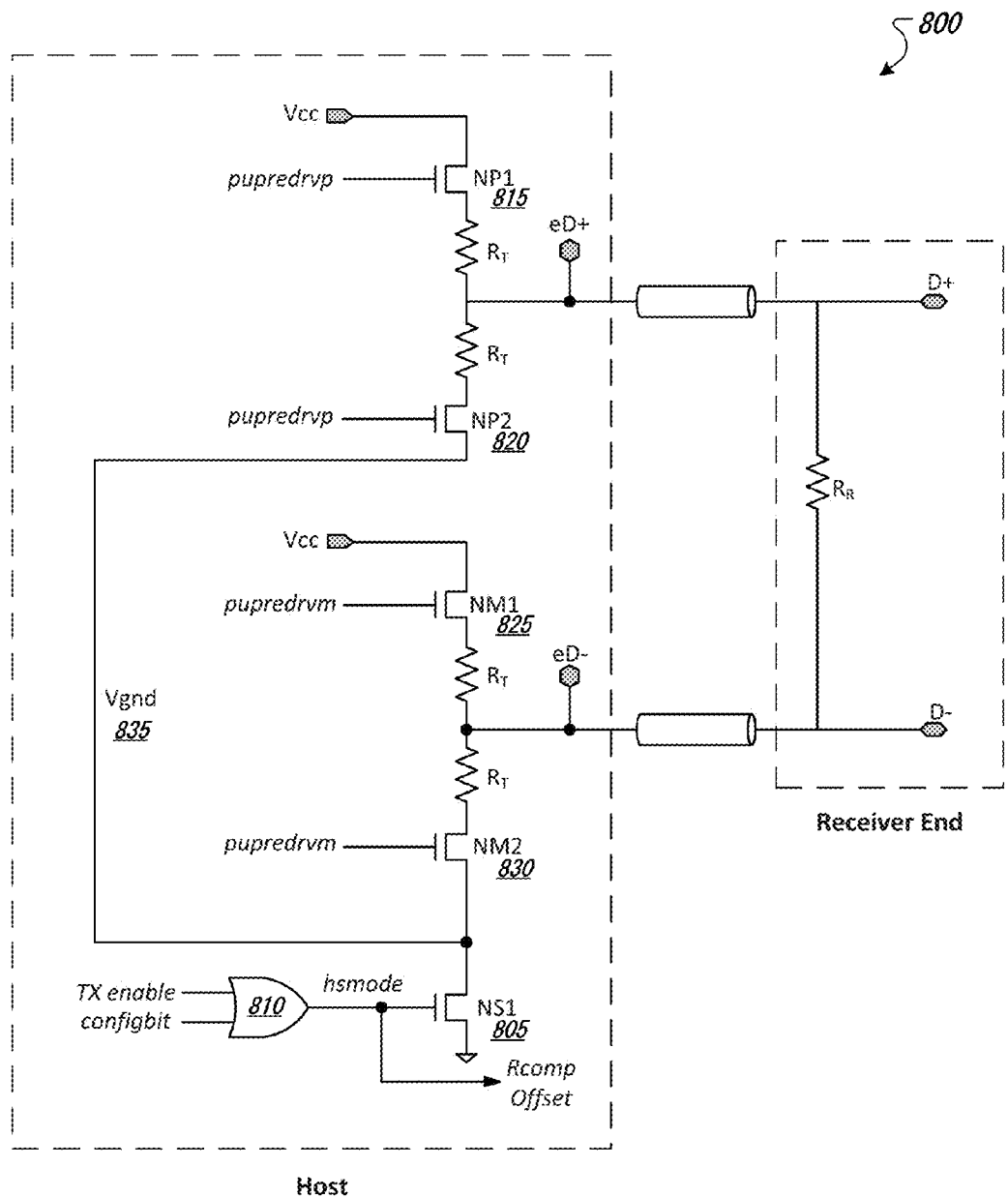
FIG. 8 illustrates a schematic diagram of an improved driver circuit selectively supporting two operation modes.

FIG. 8 illustrates a simplified schematic diagram 800 of one example implementation of an improved eUSB driver design. In this implementation, a single driver is utilized to serve termination purposes during transmit and receive in either native or repeater mode. A signal can be sent to switching logic to toggle the driver between the native and repeater modes. For instance, the signal can be sent based on a register value indicating whether a given driver instance is to function in native or repeater mode within a system. Accordingly, the same eUSB block (e.g., utilizing circuitry such as illustrated in FIG. 8) in any instance of a eUSB port, whether the port is to be used in native or repeater mode. In some implementations, system BIOS can read the register and provide the value to the switching logic of each eUSB port in a system. In one example, switching logic can include a NMOS switch (NS1) 805, as shown in the diagram 800.

In the example of FIG. 8, switching logic can further include an OR gate 810 that accepts two inputs: "TX enable" and "configbit". If either value is "1", or high, a "1" or high is sent to NS1 805 which causes the eUSB driver to operate in either native or repeater mode. Additionally, in some implementations, signals used to set the operating mode of the driver can also be used to set a resistor compensation (Rcomp) offset value for use in impedance offsetting, or matching, when the driver is receiving in repeater mode (as will be described in more detail below). The value of Vcc can be designed to meet the transmit differential specified for the link. For instance, in the case of eUSB2, Vcc can be designed to be set at or around 400 mV to meet the eUSB2 transmit differential and common mode specification. The pullup (to transmit logical "1") and pulldown (to transmit logical "0") driver can be compensated to 40 ohm typically. As in the conventional design, illustrated in FIG. 7, additional transistor switch elements 815, 820, 825, 830 (e.g., NP1, NP2, NM1, NM2) can be provided to control toggling between pullup and pulldown. Switches 815, 820, 825, 830 can be driven by other signals (e.g., hspupredrv* and hspdpredrv*) provided as pre-driver outputs that control the driver to pullup and pulldown based on input data patterns and control signals.

In the present example, the control signal "hsmode" for the NMOS switch "NS1" gate 805 is a function of "TX enable" and "configbit". "TX enable" indicates whether the driver is in transmit mode ("1") or receive mode ("0"). "configbit" represents the configuration register bit that identifies whether the particular eUSB port is to operate in native (e.g., inter-chip) or repeater mode (e.g., to support legacy USB mode). Table 1 represents the "hsmode" (and operating mode) that results from the combinations of "TX enable" and "configbit" values:

TABLE 1

| Termination Mode | Native Mode | Repeater Mode - Tx | Repeater Mode - Rx |
| --- | --- | --- | --- |
| TX enable | x | 1 | 0 |
| configbit | 1 | 0 | 0 |
| hsmode | 1 | 1 | 0 |
| Rcomp bits | compensated bits | compensated bits | compensated bits + offset bits |

As noted above, Table 1 shows the control signals to switch the termination mode in eUSB2 high speed transceiver design. During native mode (receive or transmit), the NMOS switch "NS1" will always be turned on to provide virtual ground at the Vgnd node 835. No dynamic Rcomp offset is applied during native mode configuration.

Figure 9A:
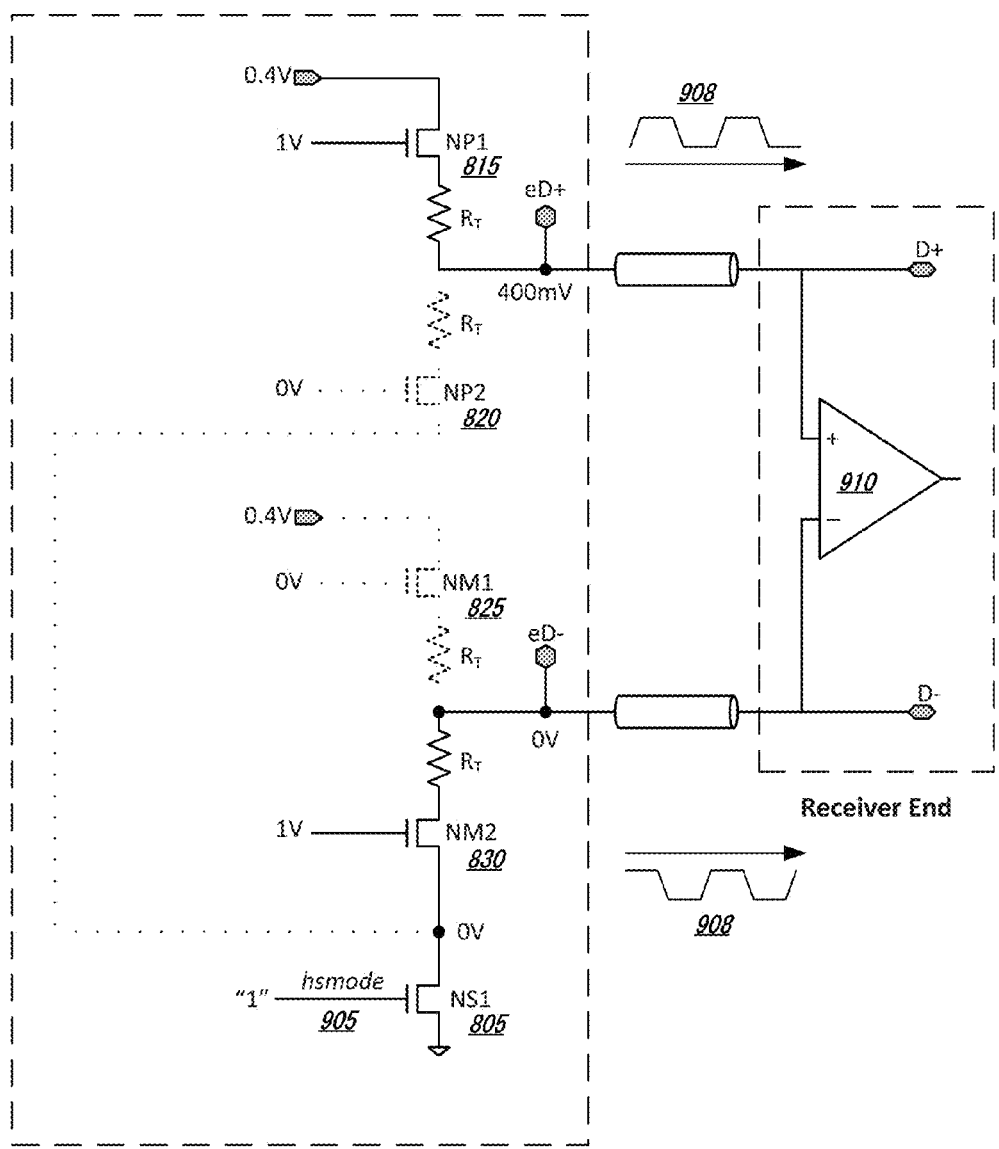
FIGS. 9A-9E illustrate operation modes of the improved driver circuit exemplified in FIG. 8.
Figure 9B:
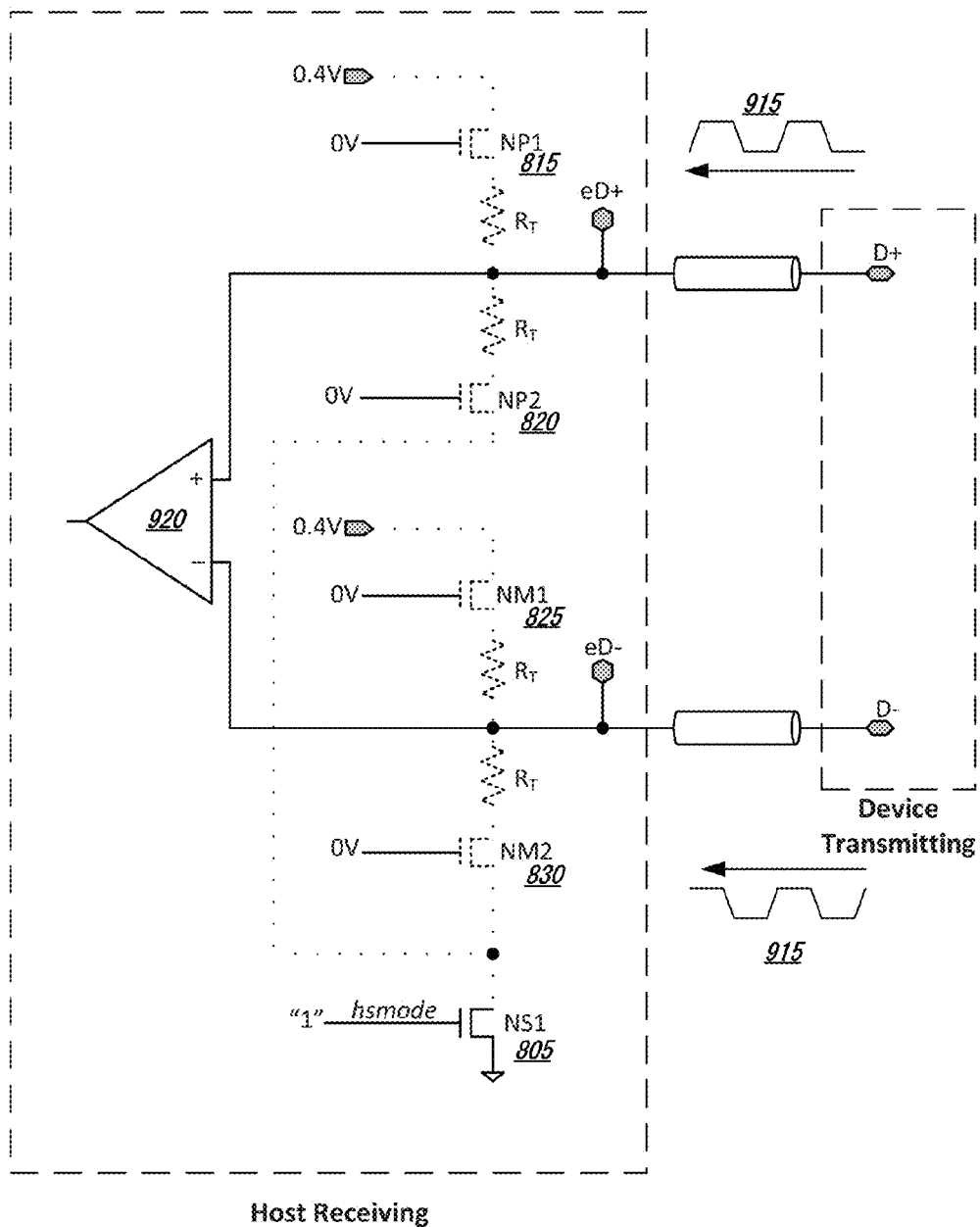

FIGS. 9A-9B illustrate the operation of the driver circuit when in native mode. (The convention utilized in FIGS. 9A-9D illustrates disabled portions of a circuit in dashed lines and enabled portions of the circuit in solid lines.) Native mode, in this example, is set by setting the configuration register value to "1" (as shown in Table 1), which causes the hsmode value 905 to be "1" and enabling transistor NS1 805. FIG. 9A illustrates the disposition of the driver circuit when in transmitting mode, the signal 908 being sent to the receiver end of another device 910. Specifically, when in transmitting mode, transistors NP1 and NM2 are enabled (e.g., by a voltage 1V being applied at the gate) and NM1 and NP2 are disabled. When the host is transmitting "1" and "0" at eD+ and eD− respectively as shown in FIG. 9A, no termination resistor is observed in the receiver end and the ideal differential swing is 400 mV. In receiver mode, as shown in the example of FIG. 9B, each of transistors NP1, NP2, NP3, and NP4 are disabled, with the device 910 transmitting a signal 915 to the host receiver 920 over a native eUSB link.

Figure 9C:
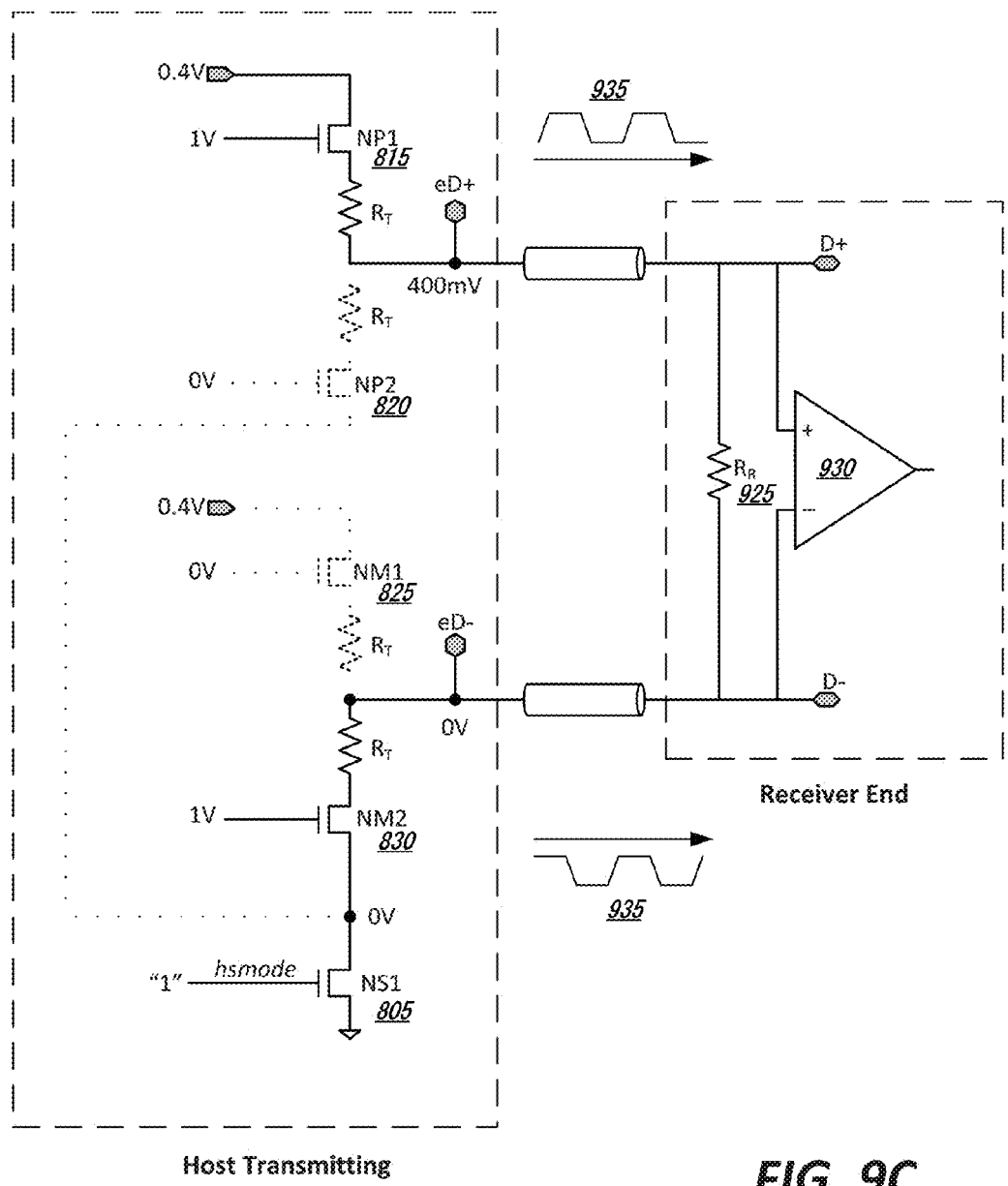
Figure 9D:
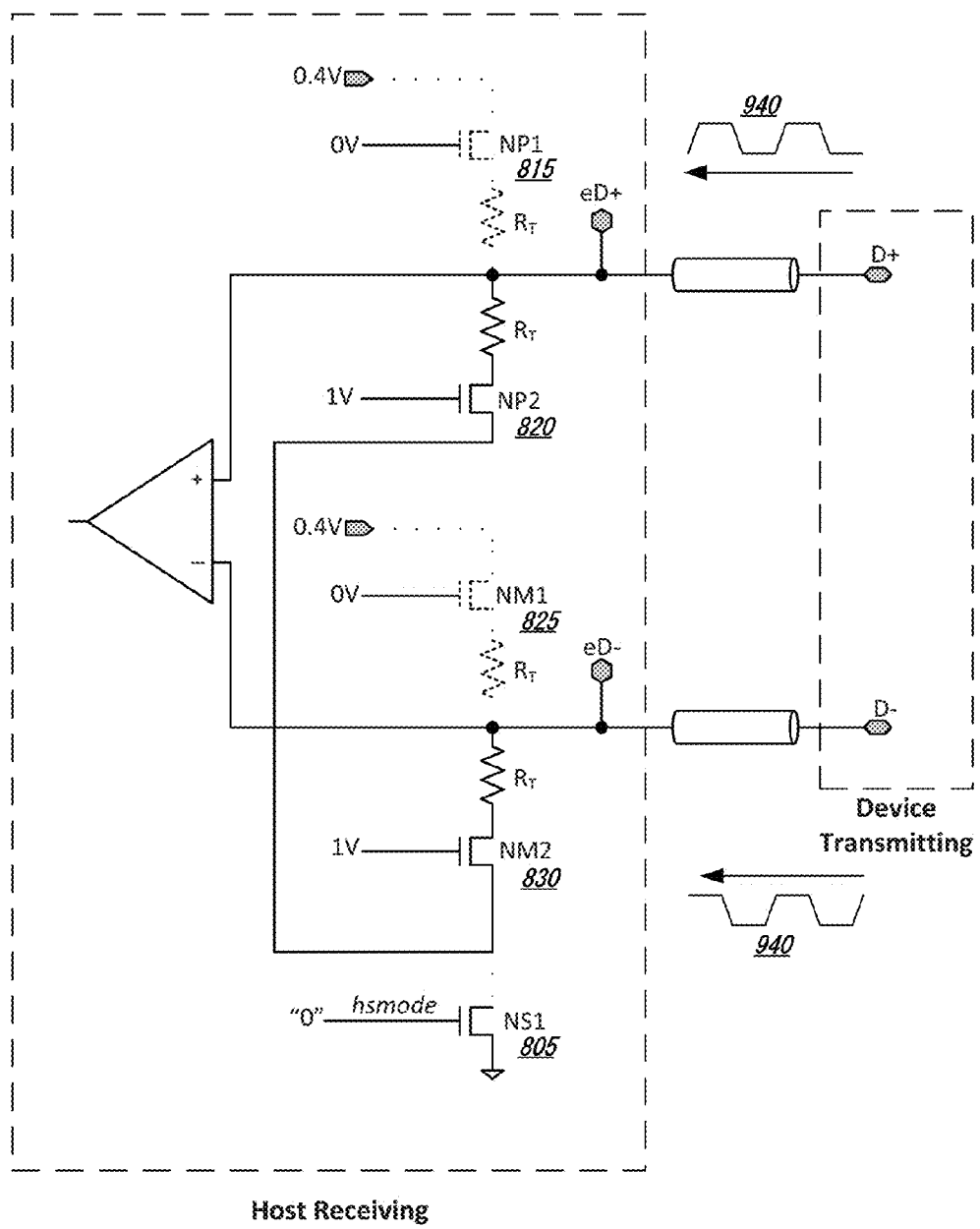

FIGS. 9C-9D show diagrams illustrating the operation of the circuit (introduced in FIG. 8) when repeater mode has been enabled in the circuit. To indicate repeater mode, the register configuration bit is "0" (as shown in Table 1). When in transmit mode, as shown in FIG. 9C, the transmission mode value "Tx mode" is high, resulting in the hsmode value 905 being driven to "1". The resulting driver circuit (on the transmitting host) resembles the driver when in transmitting mode in native mode (illustrated in FIG. 9A). As FIG. 9C represents repeater mode operation, the nature of the receiver has changed, with an impedance ($R_R$) 925 manifesting at the receiving device 930, which is to receive the signal 935 transmitted at eD+ and eD−. As an illustrative example, a termination at the receiver end (device termination) may be expected to provide 80 ohm parallel termination (e.g., provided by $R_R$ 925). The NMOS switch "NS1" is always turned on to provide virtual ground to Vgnd node.

With this configuration, the host transmitter differential swing will ideally be 200 mV.

Figure 9E:
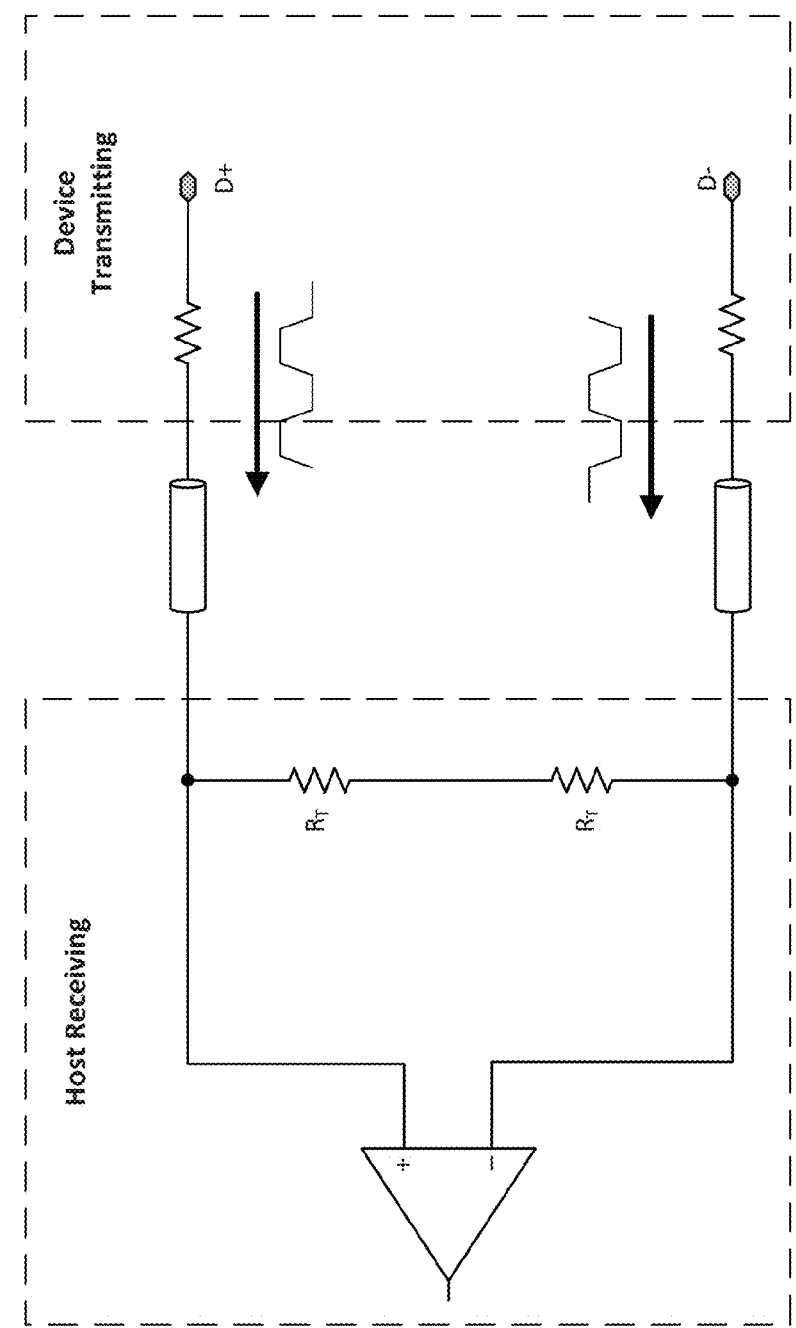

FIG. 9D illustrates operation of the flexible embedded driver circuit when in repeater receive mode. As shown in Table 1, when "Tx mode" is low, indicating receive mode, and the register configuration bit value is "0", indicating repeater mode, the circuit is in repeater receive mode and the value of hsmode 905 is driven to "0". An hsmode 905 value of "0" turns off switch NS1, and transistors NP1, NP2, NM1, NM2 are used to control when the drivers pulls up or down to generate the signal. NP2 and NM2 are turned on (e.g., by applying 1V to each gate). The resulting circuit enables repeater receiver mode, where "1" and "0" in the signal 940 are to be received at eD+ and eD− respectively and the NMOS switch "NS1" is turned off while both TX pulldown drivers (e.g., NP2, NM2) are turned on to provide a given effective impedance parallel termination as seen from the device side. FIG. 9E presents a simplified representation of the orientation of the circuit when in repeater receive mode.

In some implementations, it can be advantageous to over-terminate the receiver end. For instance, over-termination at the receiver end can result in better signal quality (e.g., as measured by signal eye quality). In a conventional design, use of a Rcomp offset capability would be applied in both the transmit and receive states of the driver using a replica driver. Using the improved driver circuit illustrated and described in FIGS. 8-9E above, the Rcomp offset is utilized selectively and only when the circuit is in receive mode (or "state"). For instance, the value of hsmode can be used to activate an offset to Rcomp to effectively increase the compensated driver impedance (differential impedance) observed by the transmitter. For instance, the value of Rcomp can be driven by a multi-bit binary value (e.g., held in a register to indicate the impedance to be applied). Increasing this value by 1 or 2 bits can provide a marginal increase in the overall compensated driver impedance. Accordingly, an Rcomp offset can cause the value of Rcomp to be increased (e.g., overdriven) by a small amount (e.g., to raise an initial Rcomp value of 80 ohms to 90 ohms). As noted above, this offset may be selectively applied to the receive mode, and, in some cases, specifically to the repeater receive mode. Accordingly, in one example (and as introduced in Table 1), when switching logic values cause the circuit to enter a repeater receive mode (e.g., when the value of hsmode is driven to "0"), a predefined offset value can be applied to an initial compensated drive impedance value Rcomp.

Figure 10:
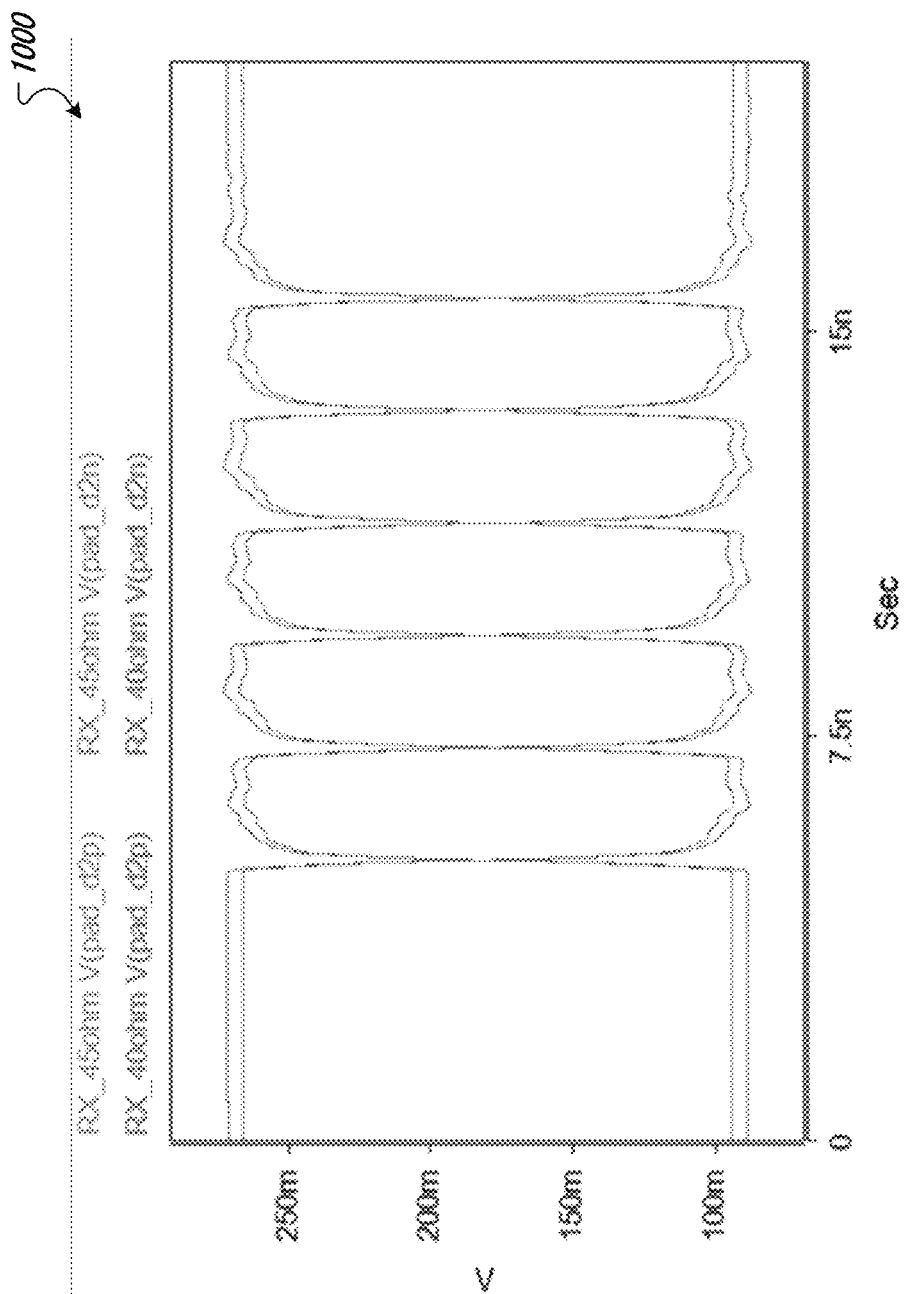
FIG. 10 illustrates a graph comparing received impedance values to signal quality.

Turning to FIG. 10, an example graph 1000 is shown illustrating a comparison of the signal eye quality at the receiver end (of an eUSB driver) in two instances. Shown in the graph are two signals, one with a taller eye height than the other. The cause of the taller receiver end signal eye height is the addition of 5 ohms of offset impedance at each of two resistors (e.g., $R_T$) enabled during repeater receive mode and providing parallel impedance at the receiver end termination. For instance, this can cause 10 ohms of total impedance to be added to overdrive an initial matched 80 ohm differential termination impedance (thereby raising the differential termination impedance to 90 ohms). In this example, this Rcomp offset results in an example improvement of approximately 10 mV in the signal eye height, as illustrated in FIG. 10. Accordingly, this could relax the receiver squelch detector and high speed receiver sensitivity design. In some examples, the transmitter eye voltage margin can be observed to be directly proportional to the receiver end termination value.

Figure 11:
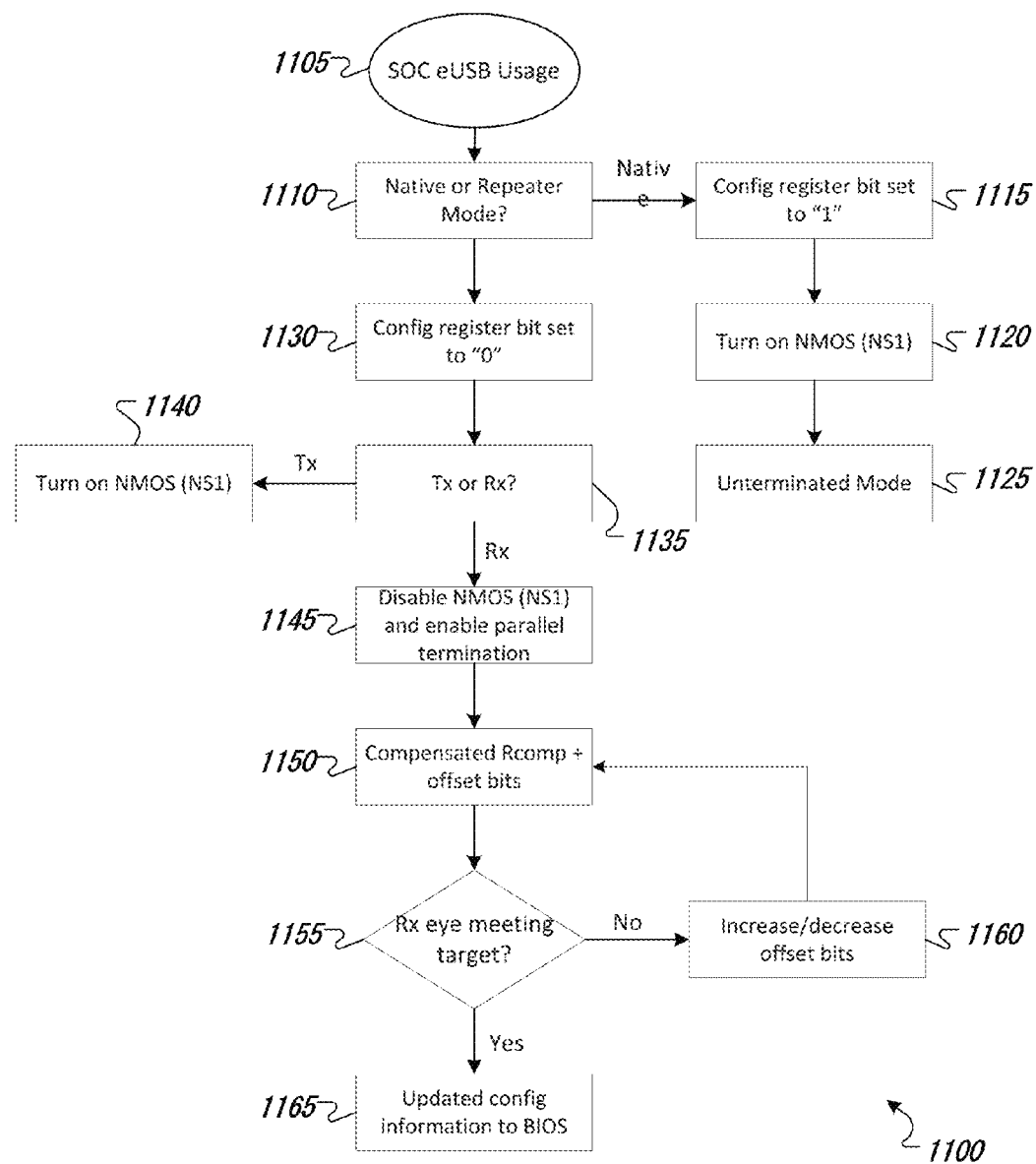
FIG. 11 illustrates a flow chart for utilizing an improved driver circuit.

Turning to FIG. 11, a flow diagram 1100 is shown illustrating use of example switching logic to enable a single driver circuit to operate as a receiver and transmitter in either a separate native (e.g., interchip) or repeater (e.g., chip to legacy device) mode. A half-duplex I/O port, such as a eUSB port, can be provided on an SoC. Use of the port can be initiated 1105 and configuration information in a register corresponding to the port can be accessed (e.g., by system BIOS or another process). From the configuration information, the port can be defined to operate in one of two support modes, native or repeater mode (e.g., at 1110). When in native mode, a corresponding configuration register value (e.g., a configuration bit) can be set to indicate native mode operation (e.g., a bit set to "1") (e.g., at 1115). This can cause at least a portion of switching logic (e.g., a transistor NS1) to be turned on (e.g., at 1120) based on a signal derived, at least in part, from the configuration register value. Turning on this portion of the switching logic can cause the switching logic to cause the driver circuit to operate in an unterminated mode 1125 in both the transmitting and receiving directions of half-duplex communication.

In instances where the configuration information indicates that a given port is to operate in repeater mode (e.g., to connect to a repeater device that is to facilitate, or bridge, communication over two different physical layers, one of the embedded interconnect and the other of a legacy interconnect (e.g., USB2.0)), the corresponding configuration register value (e.g., a configuration bit) can be set to indicate repeater mode operation (e.g., a bit set to "0") (e.g., at 1130). When the circuit is operating in transmit mode, or state, switching logic is caused 1140 (e.g., by turning on a transistor NS1) to place the circuit in a mode of operation to transmit a signal to a receiving device (e.g., a device according to a legacy PHY). However, when in repeater receive mode, the switching logic is caused 1145 (e.g., by disabling a transistor NS1) to place the circuit in a mode of operation to receive signals from the transmitting device in a parallel termination. Indeed, the switching logic can cause the parallel termination to be enabled at the driver circuit. Further, in some implementations, switching logic can enable dynamic adjustment of the parallel impedance manifesting at the parallel termination in order to improve signal quality (e.g., signal eye height, etc.). For instance, in addition to enabling the parallel termination in repeater receive mode, the switching logic can cause an offset to be applied (e.g., 1150) to a defined compensated impedance value to marginally raise (e.g., at 1160) the impedance. In one implementation, bits can be added to a binary Rcomp value in response to a signal sent or generated by the switching logic to cause the Rcomp value, and corresponding impedance, to be dynamically raised. Signal quality observed at the receiver can be observed (e.g., 1155) to determine whether the signal meets predefined targets (e.g., to test the signal to determine whether characteristics of its signal eye meets a predefined target. In some cases, this signal quality assessment 1155 can be provided at runtime. In other instances, signal quality can be assessed at configuration time. In either implementation, if the offset applied (e.g., 1150) (or the original Rcomp value) does not result in a signal of sufficient quality, additional offset can be applied 1160 until the signal quality is modified to meet the target. When the appropriate offset is determined for the link (operating in repeater receive mode), the determined offset value can be saved to update a corresponding register value for Rcomp (or Rcomp offset) to be applied at the port during repeater receive mode. System BIOS (or another process)

can read these configuration values to cause these values to apply to the electronic circuit and communications of the port.

As noted above, the driver circuit described above can allow a common circuit core to be employed to implement potentially multiple ports of a corresponding embedded interconnect that supports two or more modes of operation. Rather than requiring designers to configure the ports, at the hardware level, to operate in each port's respective mode of operation, a single port design can be provided that supports any one of the supported modes of operation. The designer, in this case, defines the mode of operation simply in a configuration register corresponding to the port. The configuration register can additionally include Rcomp and/or Rcomp offset values used in one or more modes to allow the appropriate compensated impedance to be applied at that specific port (e.g., as each port instance may connect to a different device or device type). In some implementations, multiple instances of the improved driver circuit can be provided in multiple ports of a single system, such as a system on chip, with some of the driver circuit instances' configuration registration values indicating that the corresponding driver circuits are to operate in one mode (e.g., a native mode), and another portion of the driver circuit instances configured to operate in another of the modes (e.g., a repeater mode).

The concepts described herein can enables a single interconnect driver circuit design, such as an eUSB2 driver circuit, to be flexibly implemented in multiple different platform topologies simply by changing corresponding configuration register bits (e.g., through a BIOS update). Such features can be beneficially used in IP and SoC design and improve product flexibility to support unplanned design changes that can occur, sometimes at the last minute, in system design. These features can be adopted with minimum changes on the eUSB2 PHY configuration register while demanding no additional power being burned by the host driver during receiver mode. The same driver circuit can be used to support potentially all the high speed operations in different platform topologies and thereby minimize die size growth by supporting terminated and un-terminated mode within a single circuit solution. Such solutions can allow the removal of legacy connections demanding more silicon resources and power, such as legacy 3.3V transistor, among other example uses and advantages.

While some of the implementations and examples discussed above made specific reference to particular interconnect technologies (e.g., USB and eUSB) and their corresponding operating modes, it should be appreciated that the concepts described above can be applied to other interconnect ports, such as other ports providing half-duplex interconnect links and multiple operating modes, among other examples. Further, the above principles can be applied to other version of eUSB and USB, among other alternative examples and implementations.

Figure 12:
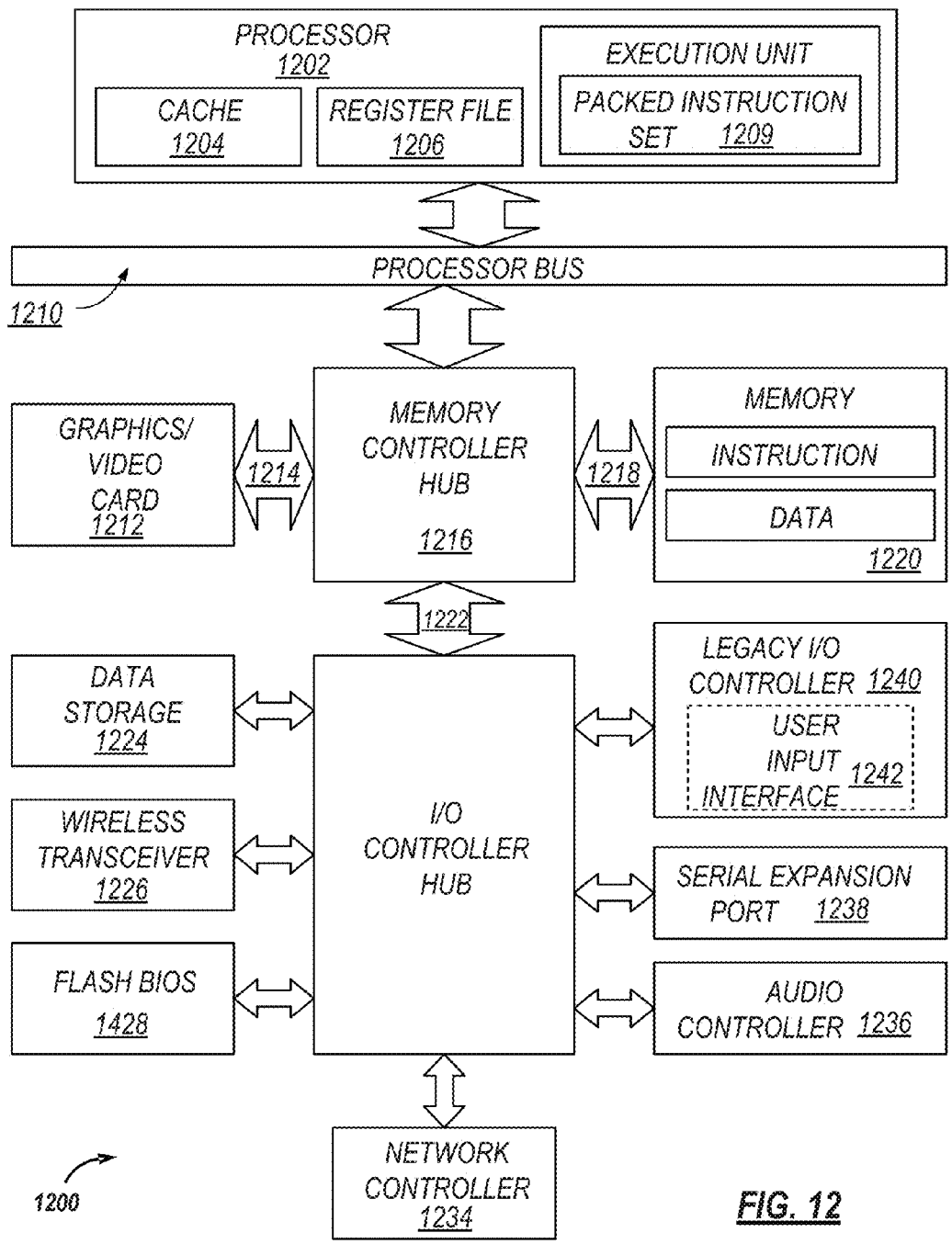
FIG. 12 illustrates a block diagram for a computing system.

The principles and features described herein can be incorporated in any variety of computing devices and systems, including mainframes, server systems, personal computers, mobile computers (such as tablets, smartphones, personal digital systems, etc.), smart appliances, gaming or entertainment consoles and set top boxes, among other examples. For instance, FIG. 12 illustrates a block diagram of an exemplary computer system formed with a processor that includes execution units to execute an instruction, where one or more of the interconnects implement one or more features in accordance with one embodiment of the present invention is illustrated. System 1200 includes a component, such as a processor 1202 to employ execution units including logic to perform algorithms for process data, in accordance with the present invention, such as in the embodiment described herein. System 1200 is representative of processing systems based on the PENTIUM III™, PENTIUM 4™, Xeon™, Itanium, XScale™ and/or StrongARM™ microprocessors, although other systems (including PCs having other microprocessors, engineering workstations, set-top boxes and the like) may also be used. In one embodiment, sample system 1200 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1202 includes one or more execution units 1208 to implement an algorithm that is to perform at least one instruction. One embodiment may be described in the context of a single processor desktop or server system, but alternative embodiments may be included in a multiprocessor system. System 1200 is an example of a 'hub' system architecture. The computer system 1200 includes a processor 1202 to process data signals. The processor 1202, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1202 is coupled to a processor bus 1210 that transmits data signals between the processor 1202 and other components in the system 1200. The elements of system 1200 (e.g. graphics accelerator 1212, memory controller hub 1216, memory 1220, I/O controller hub 1224, wireless transceiver 1226, Flash BIOS 1228, Network controller 1234, Audio controller 1236, Serial expansion port 1238, I/O controller 1240, etc.) perform their conventional functions that are well known to those familiar with the art.

In one embodiment, the processor 1202 includes a Level 1 (L1) internal cache memory 1204. Depending on the architecture, the processor 1202 may have a single internal cache or multiple levels of internal caches. Other embodiments include a combination of both internal and external caches depending on the particular implementation and needs. Register file 1206 is to store different types of data in various registers including integer registers, floating point registers, vector registers, banked registers, shadow registers, checkpoint registers, status registers, and instruction pointer register.

Execution unit 1208, including logic to perform integer and floating point operations, also resides in the processor 1202. The processor 1202, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1202. For one embodiment, execution unit 1208 includes logic to handle a packed instruction set 1209. By including the packed instruction set 1209 in the instruction set of a general-purpose processor 1202, along with associated circuitry to execute the instructions, the operations used by many multimedia applications may be performed using packed data in a general-purpose processor 1202. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1208 may also be used in micro controllers, embedded processors, graphics devices, DSPs, and other types of logic circuits. System 1200 includes a memory 1220. Memory 1220 includes a dynamic random access memory (DRAM) device, a static random access memory (SRAM) device, flash memory device, or other memory device. Memory 1220 stores instructions and/or data represented by data signals that are to be executed by the processor 1202.

Note that any of the aforementioned features or aspects of the invention may be utilized on one or more interconnect illustrated in FIG. 12. For example, an on-die interconnect (ODI), which is not shown, for coupling internal units of processor 1202 implements one or more aspects of the invention described above. Or the invention is associated with a processor bus 1210 (e.g. other known high performance computing interconnect), a high bandwidth memory path 1218 to memory 1220, a point-to-point link to graphics accelerator 1212 (e.g. a Peripheral Component Interconnect express (PCIe) compliant fabric), a controller hub interconnect 1222, an I/O or other interconnect (e.g. USB, PCI, PCIe) for coupling the other illustrated components. Some examples of such components include the audio controller 1236, firmware hub (flash BIOS) 1228, wireless transceiver 1226, data storage 1223, legacy I/O controller 1210 containing user input and keyboard interfaces 1242, a serial expansion port 1238 such as Universal Serial Bus (USB), and a network controller 1234. The data storage device 1223 can comprise a hard disk drive, a floppy disk drive, a CD-ROM device, a flash memory device, or other mass storage device.

Figure 13:
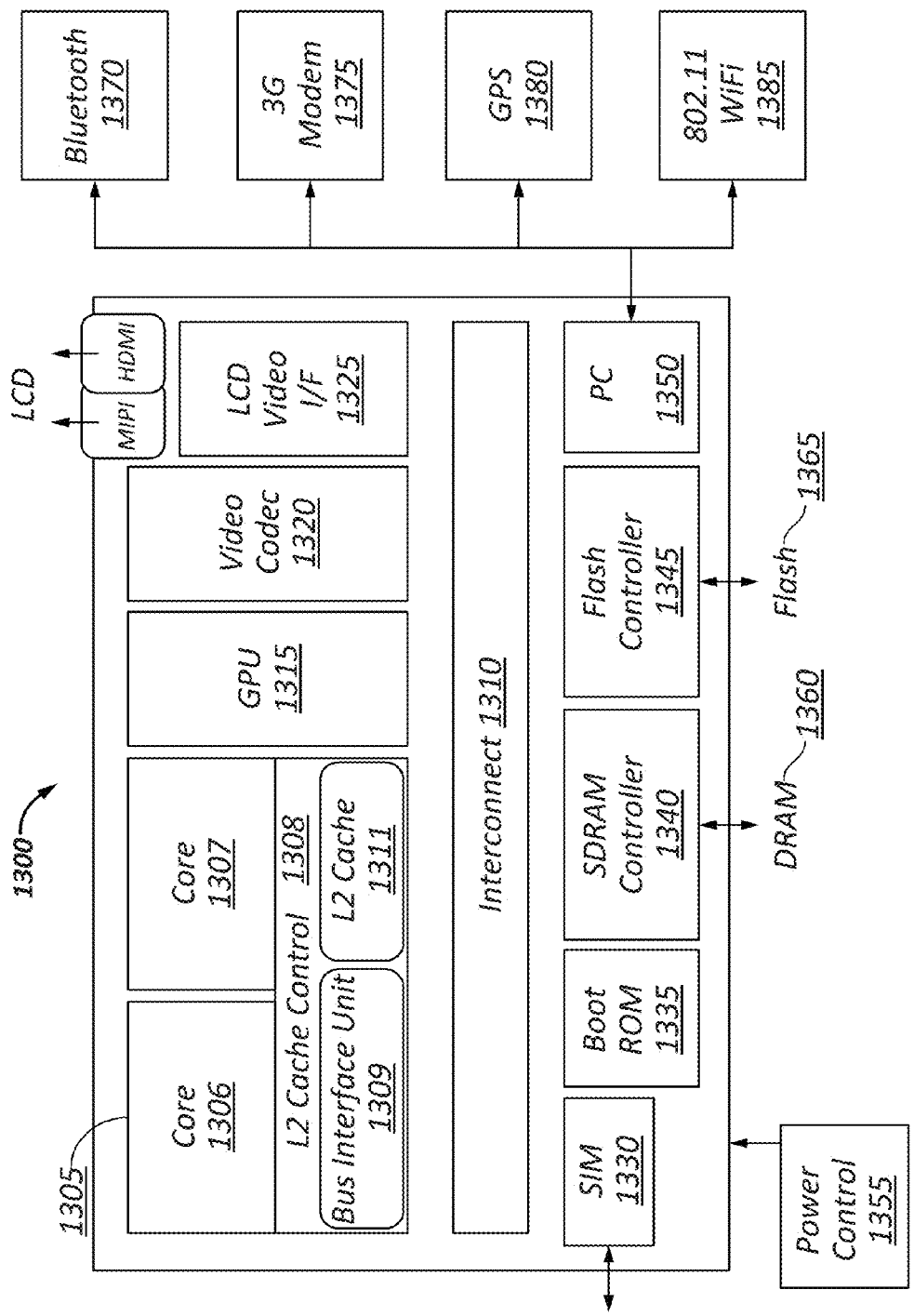
FIG. 13 illustrates another embodiment of a block diagram for a computing system including a system on chip.

Turning next to FIG. 13, an embodiment of a system on-chip (SOC) design in accordance with the inventions is depicted. As a specific illustrative example, SOC 800 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1300 includes 2 cores—1306 and 1307. Similar to the discussion above, cores 1306 and 1307 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1306 and 1307 are coupled to cache control 1308 that is associated with bus interface unit 1309 and L2 cache 1311 to communicate with other parts of system 1300. Interconnect 1310 includes an on-chip interconnect, such as an IOSF, AMBA, or other interconnect discussed above, which potentially implements one or more aspects of described herein.

Interconnect 1310 provides communication channels to the other components, such as a Subscriber Identity Module (SIM) 1330 to interface with a SIM card, a boot rom 1335 to hold boot code for execution by cores 1306 and 1307 to initialize and boot SOC 1300, a SDRAM controller 1340 to interface with external memory (e.g. DRAM 1360), a flash controller 1345 to interface with non-volatile memory (e.g. Flash 1365), a peripheral control 1350 (e.g. Serial Peripheral Interface) to interface with peripherals, video codecs 1320 and Video interface 1325 to display and receive input (e.g. touch enabled input), GPU 1315 to perform graphics related computations, etc. Any of these interfaces may incorporate aspects of the invention described herein.

In addition, the system illustrates peripherals for communication, such as a Bluetooth module 1370, 3G modem 1375, GPS 1385, and WiFi 1385. Note as stated above, a UE includes a radio for communication. As a result, these peripheral communication modules are not all required. However, in a UE some form a radio for external communication is to be included.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. One or more embodiments may provide an apparatus, a system, a machine readable storage, a machine readable medium, a method, and hardware- and/or software-based logic (e.g., implemented in connection with a shared memory controller) to implement a port to facilitate a link between a first device and a second device. The port can include a driver circuit to support half duplex communication between the first device and the second device and switching logic to receive a value and cause the driver circuit to function in one of a plurality of half duplex modes based on the value. The value is based on a configuration register value corresponding to the port.

In one example, the plurality of modes includes a native mode for inter-chip communication and a repeater mode for communication with a peripheral device over a repeater device.

In one example, ports of the first and second devices share a common protocol layer, the port of the first device includes a first physical layer, the port of the second device includes a different second physical layer, and the first physical layer is electrically incompatible with the second physical layer.

In one example, the half-duplex communication, in each of the plurality of half duplex modes, includes a receive state and a transmit state, and receiver ends in a first of the plurality of modes are unterminated and receiver ends in a second of the plurality of modes are terminated.

In one example, receiver ends in the second mode are terminated by a differential parallel termination.

In one example, the termination includes an adjustable impedance device.

In one example, the port further includes impedance compensation logic to adjust impedance of the impedance device based on a register value.

In one example, the switching logic is to provide a signal to increase an offset value of the register value and cause impedance of the impedance device to be increased.

In one example, the switching logic provides the signal for a particular one of the plurality of modes while in a receiver half duplex state.

In one example, the port includes an Embedded Universal Serial Bus (eUSB) port, and the plurality of modes include an eUSB native mode and an eUSB repeater mode.

In one example, the configuration register value is set by a system Basic Input/Output System (BIOS).

In one example, the switching logic includes a transistor and an OR gate to receive the configuration register value and a transmit state value to indicate whether the driver circuit is in a transmit or receive state.

In one example, the transistor includes an NMOS transistor coupled to a virtual ground.

One or more embodiments may provide an apparatus, a system, a machine readable storage, a machine readable medium, a method, and hardware- and/or software-based logic (e.g., implemented in connection with a shared memory controller) to identify a configuration register value corresponding to a particular port of a computing device, where the configuration register value identifies which of a plurality of half duplex operation modes, supported by driver circuitry of the port, is to be adopted by the driver circuitry during operation of the port, and provide the configuration register value as an input to switching circuitry of the driver circuitry to cause the driver circuitry to operate in the operation mode corresponding to the configuration register value.

In one example, the configuration register comprises a register compliant with an Embedded Universal Serial Bus (eUSB) register.

In one example, the configuration register value is set by a system Basic Input/Output System (BIOS).

In one example, the plurality of operation modes consist of a native mode and a repeater mode.

In one example, a resistor compensation value stored in a register is adjusted, where the resistor compensation value corresponds to the particular port, and the resistor compensation value is adjusted based on the configuration register value indicating a particular one of the plurality of operation modes.

One or more embodiments may provide an apparatus or a system that includes one or more configuration registers, a first device and a second device coupled to the first device by a link, where the second device includes driver circuitry to facilitate half-duplex communication with the first device over the link, and switching logic to receive a value to indicate a value in a particular one of the one or more configuration registers corresponding to the second device. Switching logic can cause the driver circuit to function in one of a plurality of half duplex modes based on the value.

In one example, the system includes a system-on-chip and the first and second devices includes on-chip devices.

In one example, the first device includes a peripheral device, the peripheral device is compliant with Universal Serial Bus (USB) version 2.0, and the second device is coupled to the first device by a port compliant with an embedded USB (eUSB) compliant standard.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   a port to facilitate a link between a first device and a second device, wherein the port comprises:
   a driver circuit to support half duplex communication between the first device and the second device, wherein the driver circuit comprises circuitry to support a plurality of half duplex modes, a first one of the plurality of modes comprises an unterminated mode, and a second one of the plurality of modes comprises a terminated mode, and the circuitry comprises an adjustable impedance device; and
   switching logic to:
   receive a value to cause the driver circuit to function in one of the plurality of half duplex modes based on the value, wherein the value is based on a configuration register value corresponding to the port, and cause impedance offsetting to be applied at the adjustable impedance device.

2. The apparatus of claim 1, wherein the plurality of modes comprises a native mode for inter-chip communication and a repeater mode for communication with a peripheral device over a repeater device.

3. The apparatus of claim 1, wherein ports of the first and second devices share a common protocol layer, the port of the first device comprises a first physical layer, the port of the second device comprises a different second physical layer, and the first physical layer is electrically incompatible with the second physical layer.

4. The apparatus of claim 1, wherein the half duplex communication, in each of the plurality of half duplex modes, comprises a receive state and a transmit state, and receiver ends in the unterminated mode are to be unterminated and receiver ends in a second of the plurality of modes the terminated mode are to be terminated.

5. The apparatus of claim 4, wherein receiver ends in the second mode are terminated by a differential parallel termination.

6. The apparatus of claim 5, wherein the termination comprises the adjustable impedance device.

7. The apparatus of claim 6, wherein the port further comprises impedance compensation logic to adjust impedance of the impedance device based on a particular register value.

8. The apparatus of claim 7, wherein the switching logic is to provide a signal to increase an offset value of the particular register to cause impedance of the impedance device to be increased.

9. The apparatus of claim 8, wherein the switching logic provides the signal for a particular one of the plurality of modes while in a receiver half duplex state.

10. The apparatus of claim 1, wherein the port comprises an Embedded Universal Serial Bus (eUSB) port, and the plurality of modes comprise an eUSB native mode and an eUSB repeater mode.

11. The apparatus of claim 1, wherein the configuration register value is set by a system Basic Input/Output System (BIOS).

12. The apparatus of claim 1, wherein the switching logic comprises a transistor and an OR gate to receive the configuration register value and a transmit state value to indicate whether the driver circuit is in a transmit or receive state.

13. The apparatus of claim 12, wherein the transistor comprises an NMOS transistor coupled to a virtual ground.

14. At least one non-transitory machine accessible storage medium having code stored thereon, wherein the code when executed on a machine, causes the machine to:

identify a configuration register value corresponding to a particular port of a computing device, wherein the configuration register value identifies which of a plurality of half duplex operation modes, supported by driver circuitry of the port, is to be adopted by the driver circuitry during operation of the port; and provide the configuration register value as an input to switching circuitry of the driver circuitry to cause the driver circuitry to operate in the operation mode corresponding to the configuration register value; and adjust a resistor compensation value stored in a register, wherein the resistor compensation value corresponds to the particular port, and the resistor compensation value is adjusted based on the configuration register value indicating a particular one of the plurality of operation modes.

15. The storage medium of claim 14, wherein the configuration register comprises a register compliant with an Embedded Universal Serial Bus (eUSB) register.

16. The storage medium of claim 14, wherein the configuration register value is set by a system Basic Input/Output System (BIOS).

17. The storage medium of claim 14, wherein the plurality of operation modes consist of a native mode and a repeater mode.

18. A system comprising:
one or more configuration registers;
a first device; and
a second device coupled to the first device by a link, wherein the second device comprises:
  driver circuitry to facilitate half-duplex communication with the first device over the link, wherein the driver circuit comprises circuitry to support a plurality of half duplex modes, a first one of the plurality of modes comprises an unterminated mode, and a second one of the plurality of modes comprises a terminated mode, and the circuitry comprises an adjustable impedance device; and
  switching logic to:
    receive a particular value based on a value in a particular one of the one or more configuration registers corresponding to the second device, wherein the switching logic is to cause the driver circuit to function in one of the plurality of half duplex modes based on the particular value; and
    cause impedance offsetting to be applied at the adjustable impedance device.

19. The system of claim 18, wherein the system comprises a system-on-chip and the first and second devices comprises on-chip devices.

20. The system of claim 18, wherein the first device comprises a peripheral device, the peripheral device is compliant with Universal Serial Bus (USB) version 2.0, and the second device is coupled to the first device by a port compliant with an embedded USB (eUSB) compliant standard.

* * * * *